(12) United States Patent
Narasimha et al.

(10) Patent No.: US 12,137,415 B2
(45) Date of Patent: Nov. 5, 2024

(54) METHODS FOR DISCONTINUOUS RECEPTION AND ENERGY SAVINGS IN NR BASED UNLICENSED CARRIER COMMUNICATION

(71) Applicant: Apple Inc., Cupertino, CA (US)

(72) Inventors: Murali Narasimha, San Ramon, CA (US); Seau S. Lim, Swindon (GB); Anthony Lee, San Diego, CA (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 504 days.

(21) Appl. No.: 17/431,277

(22) PCT Filed: Mar. 26, 2020

(86) PCT No.: PCT/US2020/024834
§ 371 (c)(1),
(2) Date: Aug. 16, 2021

(87) PCT Pub. No.: WO2020/198418
PCT Pub. Date: Oct. 1, 2020

(65) Prior Publication Data
US 2022/0132420 A1    Apr. 28, 2022

Related U.S. Application Data

(60) Provisional application No. 62/824,961, filed on Mar. 27, 2019.

(51) Int. Cl.
*H04W 52/02* (2009.01)
*H04W 74/0808* (2024.01)

(52) U.S. Cl.
CPC ... *H04W 52/0225* (2013.01); *H04W 74/0808* (2013.01)

(58) Field of Classification Search
CPC ............... H04W 72/569; H04W 72/23; H04W 52/0225; H04W 24/10; H04W 76/28;
(Continued)

(56) References Cited

U.S. PATENT DOCUMENTS 10,021,573 B2 * 7/2018 Chou ................ H04W 52/0225
2014/0198699 A1   7/2014 Makharia
(Continued)

FOREIGN PATENT DOCUMENTS

CN    113455098 A  *  9/2021  ........ H04W 52/0225
WO    2018/031136      2/2018
(Continued)

OTHER PUBLICATIONS

M. K. Maheshwari, A. Roy and N. Saxena, "DRX over LAA-LTE-A New Design and Analysis Based on Semi-Markov Model," in IEEE Transactions on Mobile Computing, vol. 18, No. 2, pp. 276-289, Feb. 1, 2019, doi: 10.1109/TMC.2018.2835443. (Year: 2019).*
(Continued)

*Primary Examiner* — William D Cumming
(74) *Attorney, Agent, or Firm* — Eschweiler & Potashnik, LLC

(57) ABSTRACT

A user equipment (UE), or other network component can operate to generate listen-before-talk (LBT) operations in order to manage power consumption by configuring the discontinuous reception (DRX) in a dynamic manner. The UE can configure an extended active time for the DRX based on whether the LBT is successful and an acquisition channel indication from a base station, e.g., a next generation NodeB (gNB). The UE can operate aperiodic wakeup occasions with or independently of periodic DRX on-durations to better manage power while monitoring a channel for unlicensed carrier communications.

20 Claims, 10 Drawing Sheets

(58) Field of Classification Search
CPC ............................ H04W 56/001; H04W 16/14;
H04W 52/0216
USPC ........................................................ 370/329
See application file for complete search history.

(56) References Cited

U.S. PATENT DOCUMENTS

| | | | |
|---|---|---|---|
| 2016/0302076 A1* | 10/2016 | Chou ................ | H04W 52/0225 |
| 2018/0368164 A1 | 12/2018 | Lunden | |
| 2019/0124690 A1* | 4/2019 | Siomina ................ | H04W 24/10 |
| 2021/0235491 A1* | 7/2021 | Iyer ........................ | H04W 72/23 |
| 2022/0132420 A1* | 4/2022 | Narasimha ............ | H04W 76/28 |
| 2022/0191966 A1* | 6/2022 | Wang ................ | H04W 52/0216 |
| 2023/0035989 A1* | 2/2023 | Awadin ............... | H04W 72/569 |
| 2023/0232453 A1* | 7/2023 | Iyer ........................ | H04W 72/23 |
| | | | 370/329 |
| 2024/0064818 A1* | 2/2024 | Demir ................ | H04W 56/001 |

FOREIGN PATENT DOCUMENTS

| | | | | |
|---|---|---|---|---|
| WO | WO-2019217852 A1 * | 11/2019 | ............ | H04W 16/14 |
| WO | WO-2020198418 A1 * | 10/2020 | ........ | H04W 52/0225 |

OTHER PUBLICATIONS

PCT Search Report dated Jul. 1, 2020 in connection with PCT Application No. PCT/US2020/024834.
PCT Written Opinion dated Jul. 1, 2020 in connection with PCT Application No. PCT/US2020/024834.
LG Electronics Inc; "Considerations on channel busy level in NR-U"; 3GPP Draft; R2-1818142; vol. RAN WG2; Nov. 2, 2018; URL:http://www.3gpp.org/ftp/tsg%5Fran/WG2%5FRL2/TSGR2%5F104/Docs/R2%2D1818142%2Ezip.
Interdigital Inc; "DRX in NR-U"; 3gpp Draft; R2-1814022; vol. Ran WG2; Sep. 28, 2018; URL:http://www.3gpp.org/ftp/tsg%5Fran/WG2%5FRL2/TSGR2%5F103bis/Docs/R2%2D1814022%2Ezip.
Intel Corporation: "DRX enhancement for NR-u"; 3gpp Draft; R2-1900718; vol. Ran WG2; Feb. 15, 2019; URL: http://www.3gpp.org/ftp/tsg%5Fran/WG2%5FRL2/TSGR2%5F105/Docs/R2%2D1900718%2Ezip.
International Preliminary Report on Patentability dated Sep. 28, 2021 in connection with PCT Application No. PCT/US2020/024834.

* cited by examiner

610

| LBT | Channel acquisition Indication | Implies | UE action |
|---|---|---|---|
| Success | Received | gNB acquired channel but channel no longer busy (gNB no longer transmitting). | Go to sleep immediately. [This avoids the need to send explicit go-to-sleep signal when gNB does not have data for this UE.] |
| Success | Not Received | gNB did not acquire channel and channel not busy. gNB may yet acquire channel before end of on-duration | Go to sleep at end of on duration. |
| Fail | Received | gNB acquired channel and channel still busy (gNB probably still transmitting but to other UEs). | Extend active time by t ms beyond on-duration, if no PDCCH received by end of on-duration. |
| Fail | Not Received | Channel busy and gNB did not yet acquire channel before end of on-duration. | Go to sleep at end of on duration. |

620

| LBT | Channel acquisition Indication | Implies | UE action |
|---|---|---|---|
| Success | Received | gNB acquired channel but channel no longer busy (gNB no longer transmitting). | Go to sleep immediately. [This avoids the need to send explicit go-to-sleep signal when gNB does not have data for this UE.] |
| Success | Not Received | gNB did not acquire channel and channel not busy. gNB may yet acquire channel before end of on-duration | Go to sleep at end of on duration. |
| Fail | Received | gNB acquired channel and channel still busy (gNB probably still transmitting but to other UEs). | Go to sleep at end of on duration. |

FIG. 6

METHODS FOR DISCONTINUOUS RECEPTION AND ENERGY SAVINGS IN NR BASED UNLICENSED CARRIER COMMUNICATION

REFERENCE TO RELATED APPLICATIONS

This application is a National Phase entry application of International Patent Application No. PCT/US2020/024834 filed Mar. 26, 2020, which claims priority to claims the U.S. Provisional Application No. 62/824,961 filed Mar. 27, 2019, entitled "METHODS FOR DISCONTINUOUS RECEPTION AND ENERGY SAVINGS IN NR BASED UNLICENSED CARRIER COMMUNICATION", the contents of which are herein incorporated by reference in their entirety.

FIELD

The present disclosure relates to wireless technology, including to discontinuous reception and energy savings in new radio (NR) based unlicensed carrier communications.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

The Bandwidth Part (BWP) was introduced in Fifth Generation (5G) new radio (NR) systems, targeting to flexibly and dynamically configure User Equipment (UE) operating bandwidth to achieve power efficiency. In general, a UE can monitor a set of Physical Downlink Control Channel (PDCCH) candidates in one or more control resource sets (CORESETs) on an active downlink (DL) BWP on each activated serving cell according to corresponding search spaces, where monitoring implies or refers to decoding (or attempting to decode) some or all PDCCH candidates in the PDCCH candidate set according to the monitored Downlink Control Information (DCI) formats. A set of PDCCH candidates for a UE to monitor can be defined in terms of PDCCH search spaces. A search space can be a common search space (CSS) or a UE-specific search space (USS). According to current NR implementations, a UE can monitor PDCCH candidates in non-discontinuous reception (non-DRX) slots (or slots) in one or more of the various defined search spaces.

Ideally, a UE could be capable of monitoring PDCCH candidates configured by the next generation NodeB (gNB) so that the most/optimal scheduling flexibility can be achieved. However, due to the terminal complexity and cost concerns, the maximum number of blind decoding attempts and number of control channel elements (CCEs) for channel estimation in a UE can be limited. With the advent of NR unlicensed communication use cases, which are expected to be supported both in coverage and out of coverage, there is a need to consider methods for defining efficient mechanisms for providing power management control among different UEs operating with discontinuous (DRX) transmission.

BRIEF DESCRIPTION OF THE DRAWINGS

FIG. 6 is an example of tables of different responses to channel conditions for DRX according to various embodiments described herein

DETAILED DESCRIPTION

Figure 1:
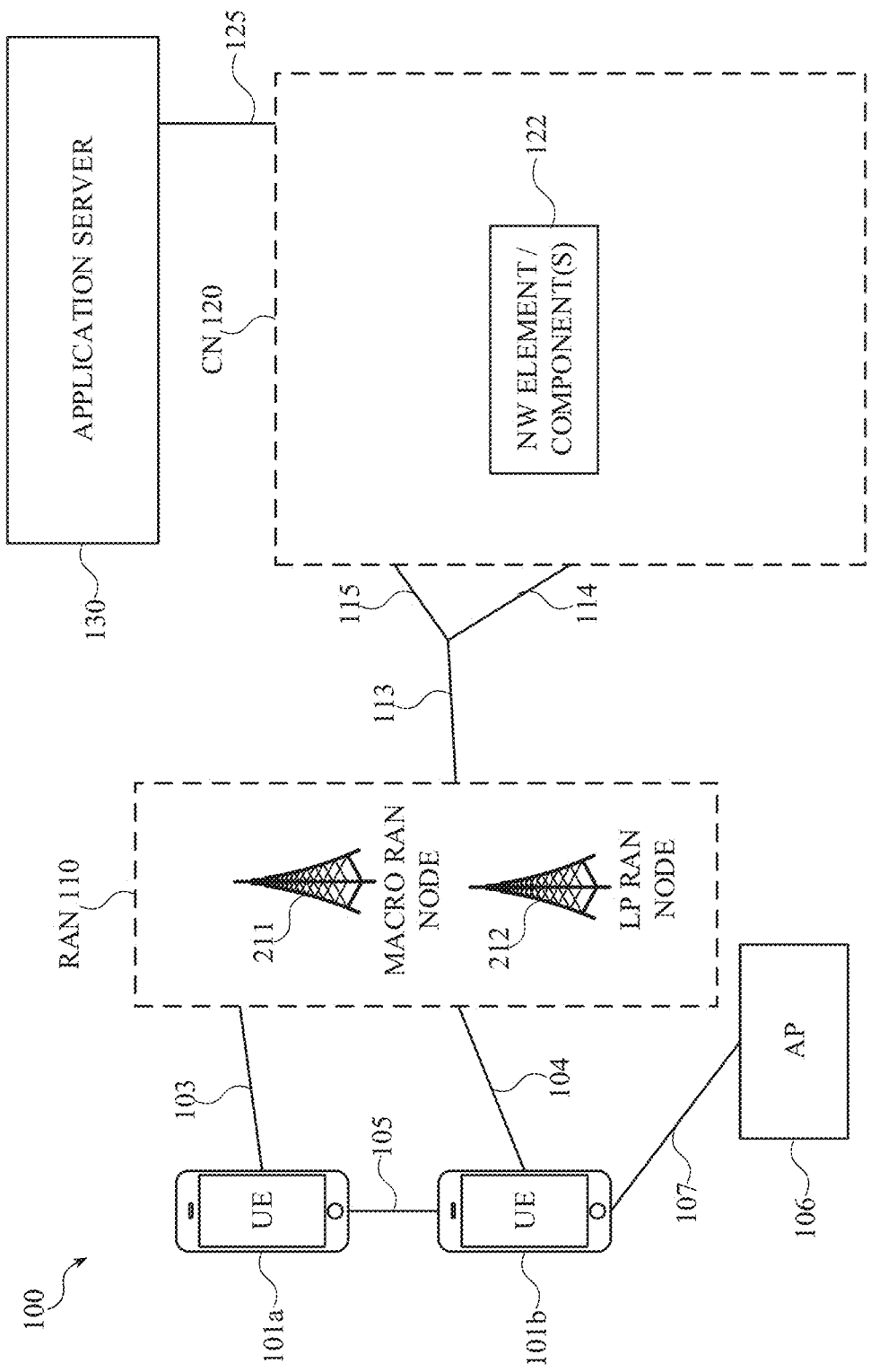
FIG. 1 is an exemplary block diagram illustrating an example of user equipment(s) (UEs) communicatively coupled a network with network components as peer devices useable in connection with various embodiments (aspects) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for managing DRX active time in order to mage power consumption at a user equipment (UE) communicating via an unlicensed carrier or channel. A listen-before-talk (LBT) can be performed on the unlicensed channel, while also monitoring for a channel acquisition indication from a next generation (g) NodeB (gNB). The UE can operate to extend the active time of the DRX or alter a DRX cycle dynamically based on the LBT and whether or not the channel acquisition indication is received. Additional aspects and details of the disclosure are further described below with reference to figures.

FIG. 1 illustrates an example architecture of a system 100 of a network, in accordance with various embodiments. The following description is provided for an example system 100 that operates in conjunction with the LTE system standards and 5G or NR system standards as provided by 2GPP technical specifications. However, the example embodiments are not limited in this regard and the described embodiments can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be an next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface or layer (discussed in further detail below).

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

In V2X scenarios one or more of the RAN nodes 111 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 101 (vUEs 101). The RSU can also include internal data storage circuitry to store intersection map geometry, traffic statistics, media, as well as applications/software to sense and control ongoing vehicular and pedestrian traffic. The RSU can operate on the 5.9 GHz DSRC band to provide very low latency communications required for high speed events, such as crash avoidance, traffic warnings, and the like. Additionally or alternatively, the RSU can operate on the cellular V2X band to provide the aforementioned low latency communications, as well as other cellular communications services. Additionally or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (μs); however, the size of the CWS and a maximum channel occupancy time (MCOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about 100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101*b* within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunneling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an EPC). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
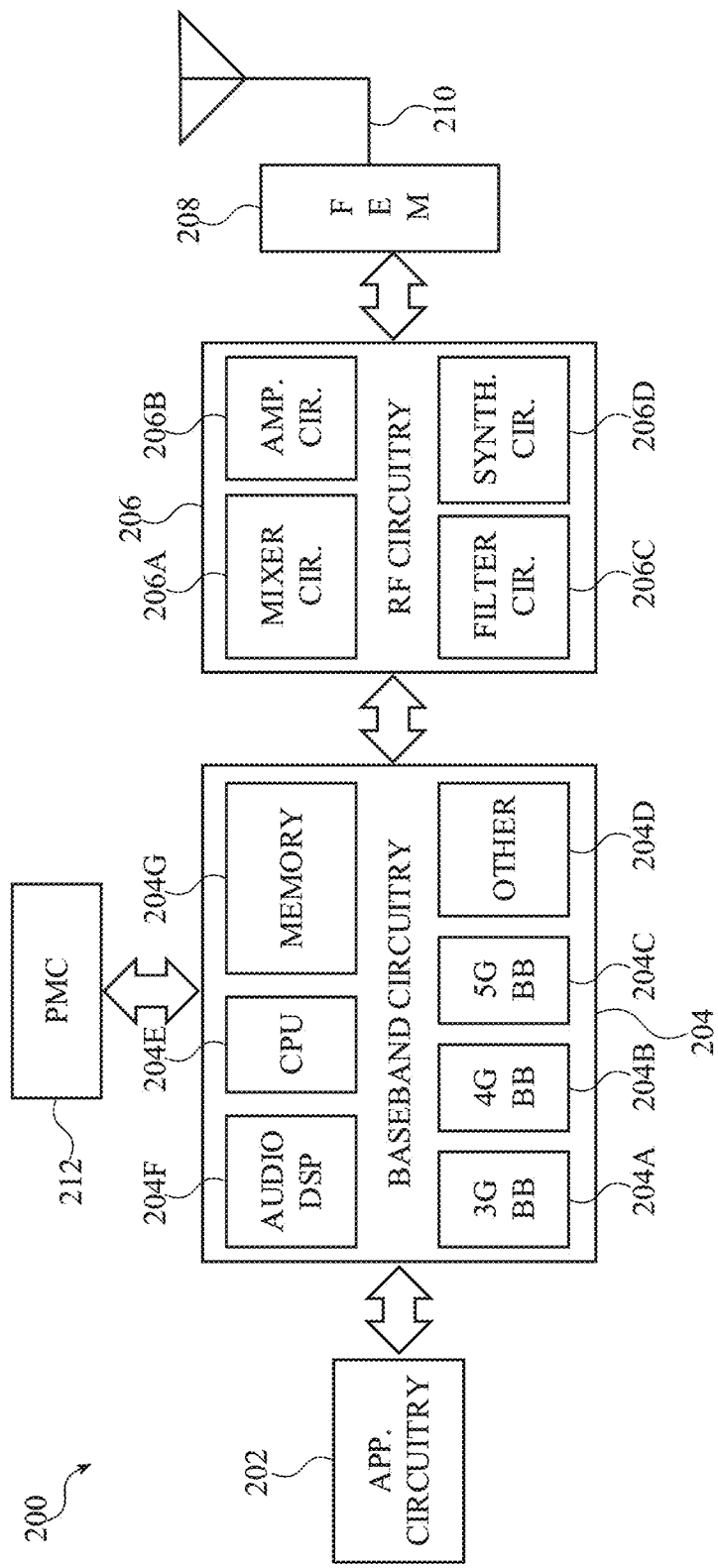
FIG. 2 is an example architecture of a system of a network, in accordance with various embodiments.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
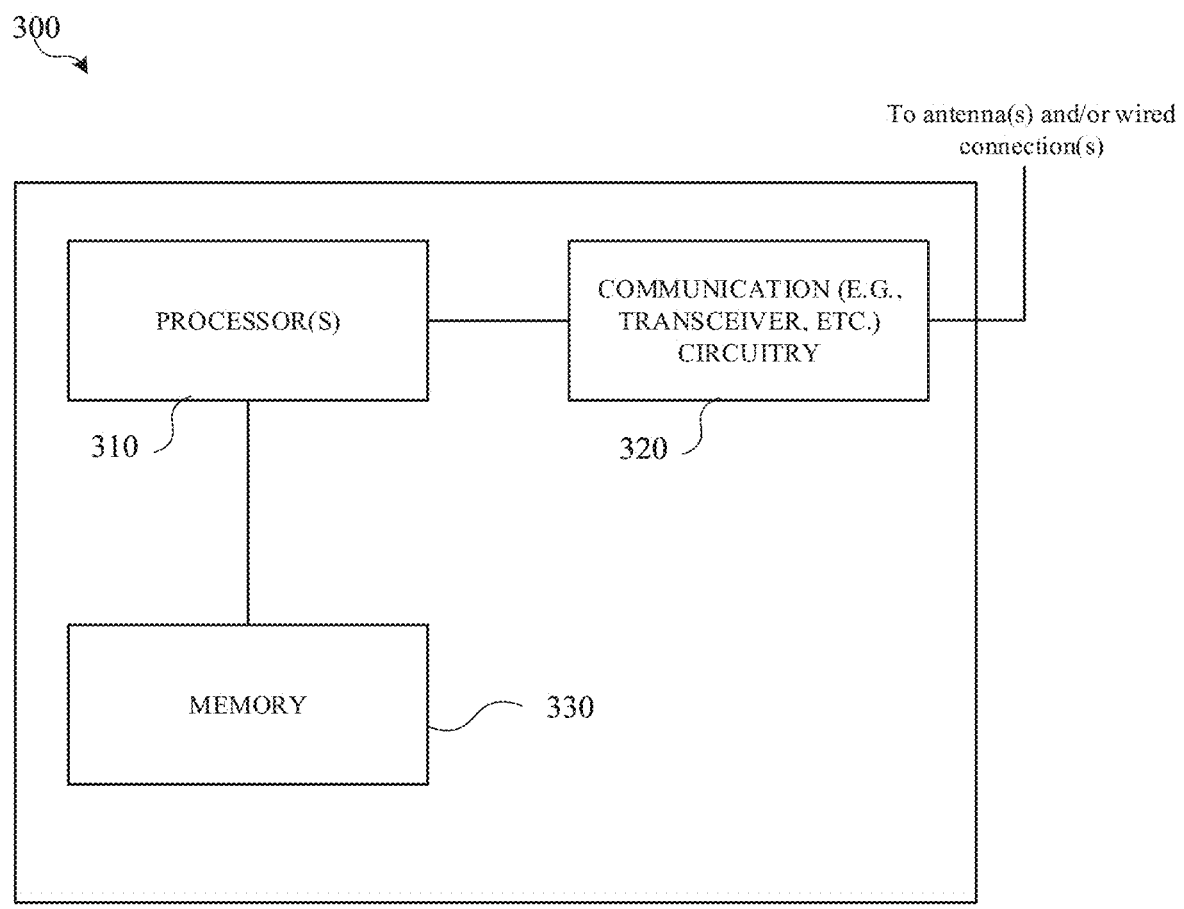
FIG. 3 is an exemplary a simplified block diagram of a user equipment wireless communication device or other network device/component (e.g., gNB) in accordance with various aspects described.

Referring to FIG. 3, illustrated is a block diagram of a user equipment wireless communication device (UE) or other network device/component (e.g., gNB, eNB, or other participating entity). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various embodiments (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (OPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

According to various embodiments, discontinuous reception (DRX) in NR is configured to optimize power consumption at the UE 101 while still allowing substantial flexibility in scheduling transmissions to the UE 101. In particular, the UE's active time can be "elastic" and be extended based on the amount of data that the gNB 110 schedules for the UE 101. If the gNB 110 has very little or no data to transmit to the UE 101, the UE 101 can revert to DRX sleep immediately after the on-duration. With this mechanism, the UE 101 can be configured with a fairly short on-duration while still allowing for delivery of a large amount of data within the DRX cycle. This ensures that the active time is short most of the time and longer only when there is a substantial amount of buffered data for the UE 101 at the gNB 110.

For operation of NR on an unlicensed carrier (referred to as NR-u in 3GPP) and associated with embodiments/aspects/examples in this disclosure, transmissions can be performed after ensuring that the channel is not already being used by another device. This is done using a procedure called Listen-before-talk (LBT), where the device (e.g., gNB 110) wishing to transmit performs a channel measurement to check if the channel is busy. The device transmits only if LBT succeeds, i.e., the channel is found to be not busy, or is idle/available for use.

One consequence of the requirement to perform LBT is that transmissions can be delayed. If a gNB 110 has data for a UE 101 and a UE 101 is in its active time (awake and not asleep in idle mode itself), the gNB 110 can still not necessarily be able to transmit to the UE 101 because the channel is busy. This is natural given the shared nature of the unlicensed medium; however, it implies that in order to achieve the same latency for the data, the network (or gNB 110) has to configure DRX for the UE 101 such that the UE 101 wakes up more often (e.g., a shorter DRX cycle than prior to the (re) configuration of DRX) or stays awake longer (e.g., DRX duration is lengthened). In fact, it has been shown in past studies for LTE license assisted access (LAA), that even modest increases in activity on the carrier significantly increase the required active time (and correspondingly power consumption of the UE 101).

Thus, various embodiments/aspects/examples herein are targeted at 3GPP standards to be adopted and implemented in NR products supporting NR-unlicensed (NR-u). Such embodiments are presented as methods, operations, devices, or components below that minimize the impact to UE 101 power consumption from NR-u operation associated with DRX in NR based unlicensed communications.

Figure 4:
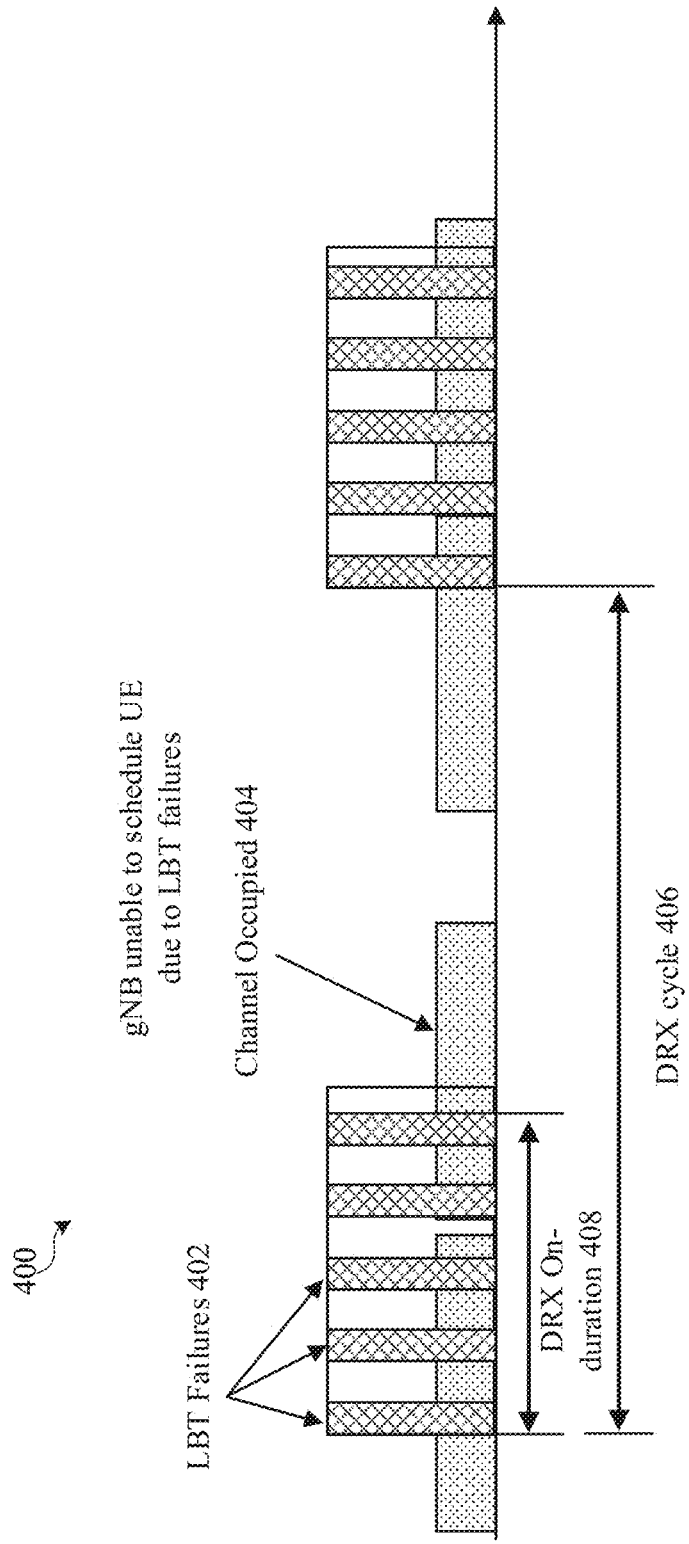
FIG. 4 is an exemplary block diagram of channel conditions for discontinuous reception (DRX) in an unlicensed communication according to various embodiments described herein.

FIG. 4 is a block diagram 400 illustrating various DRX parameters associated with the UE 101 to be monitored for enabling NR unlicensed communication. The UE 101 is configured with DRX parameters that includes a DRX cycle duration or DRX cycle 406 and an offset (between on periods), as well as a DRX on-duration period 408. The DRX cycle duration 406 and offset define the times at which the UE 101 is requires to start monitoring the channel. The UE 101 monitors the channel for at least the DRX on-duration period 408. If the UE 101 receives a PDCCH from its gNB 110 during the on-duration 408, the UE 101 continues to monitor for additional transmissions from the gNB 110. Thus, the active time is at least the on-duration 408, and can be extended dynamically if the UE 101 receives PDCCHs during the on-duration 408, for example.

On an NR-u carrier, the gNB 110 is configured to perform LBT (e.g., LBT failures 402) before transmitting to make sure that other networks are not already transmitting at the time. Transmissions by all devices on the carrier are limited to a maximum channel occupancy duration (e.g., a maximum channel occupancy time (MCOT)). The gNB 110 can frequently find the channel to be occupied 404 during the UE's on-duration 408 and thus could be unable to transmit data to the UE 101, which results in data transfer to the UE 101 experiencing delays. In order to minimize the instances where the gNB 110 is unable to transmit to the UE 101, the gNB 110 can configure the DRX such that the DRX cycle 406 is short(er), or the DRX on-duration 408 is long(er). Both of these could otherwise result in an increase in power consumption at the UE 101.

Figure 5:
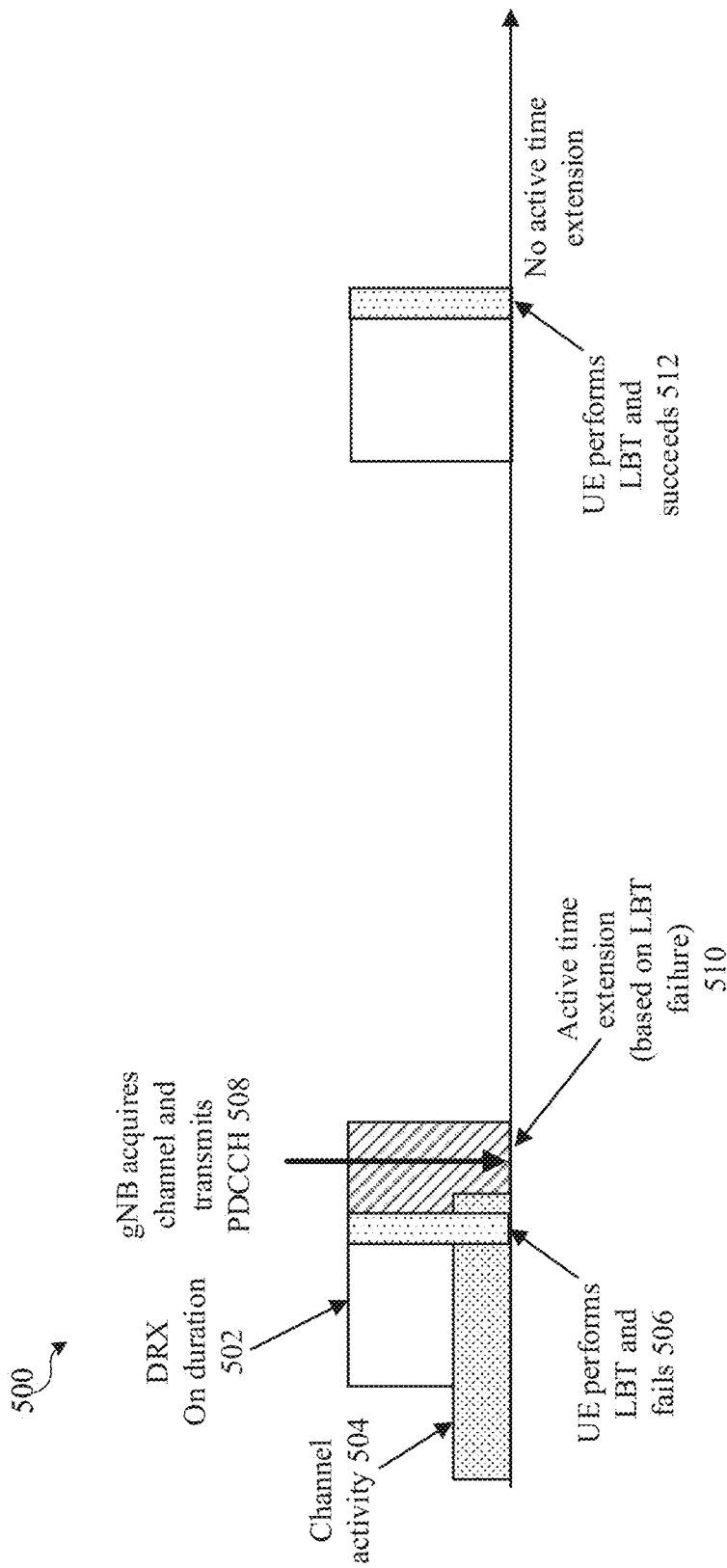
FIG. 5 is another exemplary block diagram of a DRX configuration for an unlicensed channel according to various embodiments described herein.

FIG. 5 is another block diagram 500 of an active time extension based on channel activity from other networks according to various embodiments. If the channel (e.g., an unlicensed channel for the UE 101) is busy and the gNB 110 is not expected to be able to acquire the channel, the UE 101 monitoring for transmissions from the gNB 110 (e.g., via a physical downlink channel, PDCCH, or the like) can be wasteful. To avoid unnecessarily monitoring of the channel various embodiments can be configured to manage or reduce power consumption at the UE 101.

In one embodiment, the UE 101 performs LBT (e.g., 506) during the on-duration 502 to see if the channel is busy such as by other channel activity 504. The LBT parameters can be configured by the gNB 110 (for example, the gNB 110 can configure the duration of the LBT). If the channel is found to be busy at the LBT 506, the UE 101 can be configured to extend, modify, or activate an extension of its active time 502 by a pre-defined duration 510. The underlying assumption is that the gNB 110 could potentially have data for the UE 101 such as by acquiring the channel and transmitting PDCCH 508, and could have been unable to transmit to the UE 101 due to LBT failure 506. Extending the active time 510 enables significantly more scheduling opportunities.

In other aspects, the LBT results at the gNB 110 and the UE 101 can be different, for example, when there is a hidden node such that one of: the gNB 110 or the UE 101, can hear/detect this hidden node, but the other cannot. In order to minimize the impact of having different LBT results at the UE 101 and the gNB 110, the gNB 110 can configure a specific time at which the UE 101 performs LBT 512, in which no active extension time could be configured thereafter as an option.

If the LBT fails at the gNB 110, but instead succeeds at the UE 101, then in another aspect the gNB 110 can assume that the active time has been extended with an active time extension 510 and still transmit to the UE 101 in the extended active time. In such a situation, if the gNB 110 detects an absence of an ACK or NACK from the UE 101, it then can halt further transmissions until the next DRX on-duration in time.

FIG. 6 is an example of tables 610 and 610 of different embodiments of UE 101 and gNB 110 actions in response to an LBT outcome and whether a channel acquisition indication is generated. The tables 610 and 620 demonstrates different responses of the UE 101 and gNB 110 based on an LBT and a channel acquisition with respect to DRX for an unlicensed channel.

The tables 610 and 610 provide categories in the top row including, from right to left, whether an LBT is successful (idle) or not (busy) in an outcome, whether a channel acquisition is received or not, the implication for the gNB 110 and corresponding UE 101's action.

In an embodiment, the UE 101 monitors for a signal (channel acquisition indication) from the gNB 110 that indicates that the gNB 110 has acquired the channel (e.g., NR/unlicensed channel). The UE 101 performs LBT during the on-duration to see if the channel is busy. The UE 101 behaviour is based on the outcome of the LBT at the UE 101 and whether the UE 101 receives a channel acquisition indication. If the LBT outcome is successful while the channel acquisition is received, one possible behavior is that the UE goes to DRX off period, in which it goes to sleep immediately to avoid the need for the gNB 110 to send an explicit go-to-sleep signal when the gNB 110 has no data to send for the UE 101. The implication here is that the gNB 110 acquired the channel, but the channel (NR-u) is no longer busy, and that the gNB 110 is also no longer transmitting data.

If the LBT outcome is successful while no channel acquisition indication is received (an absent channel acquisition indication condition), one possible behavior is that the UE goes to DRX off period at the end of its DRX on duration (e.g., on duration 408 of FIG. 4 or 502 of FIG. 5). The implication here is that the gNB 110 did not acquire the channel and the channel is not busy, and thus, the gNB 110 could still acquire the channel before the end of the on duration.

If the LBT outcome is unsuccessful while channel acquisition indication is received, one possible behavior is that the UE extends the DRX active time by a number of t milliseconds (ms) as a predefined period, in which no PDCCH is received by the end of the DRX on duration. The implication here is that the gNB 110 acquired the channel and the channel is still busy, and thus, the gNB 110 is still transmitting but it could be to other UEs. Alternatively, as demonstrated in table 620 different from table 610, the UE 101 could go to sleep at the end of the on duration, rather than extending its DRX active time.

If the LBT outcome is unsuccessful while no channel acquisition indication is received, one possible behavior is that the UE goes to DRX off period. The implication here is that the gNB 110 did not acquire the channel and the channel is not busy, and thus, the gNB 110 could still acquire the channel before the end of the on duration. Alternatively, as demonstrated in table 620 different from table 610, is that the UE 101 extends the DRX active time by a number of t milliseconds (ms) as a predefined period, in which no PDCCH is received by the end of the DRX on duration.

In an aspect, the channel acquisition indication could be part of a transmission by the gNB 110 that is not or can not be intended for this UE 101. For example, if the gNB 110 transmits a PDCCH to another UE, the UE 101 can detect the demodulation reference signal (DMRS) in the PDCCH to determine that the gNB 110 has acquired the channel.

Figure 7:
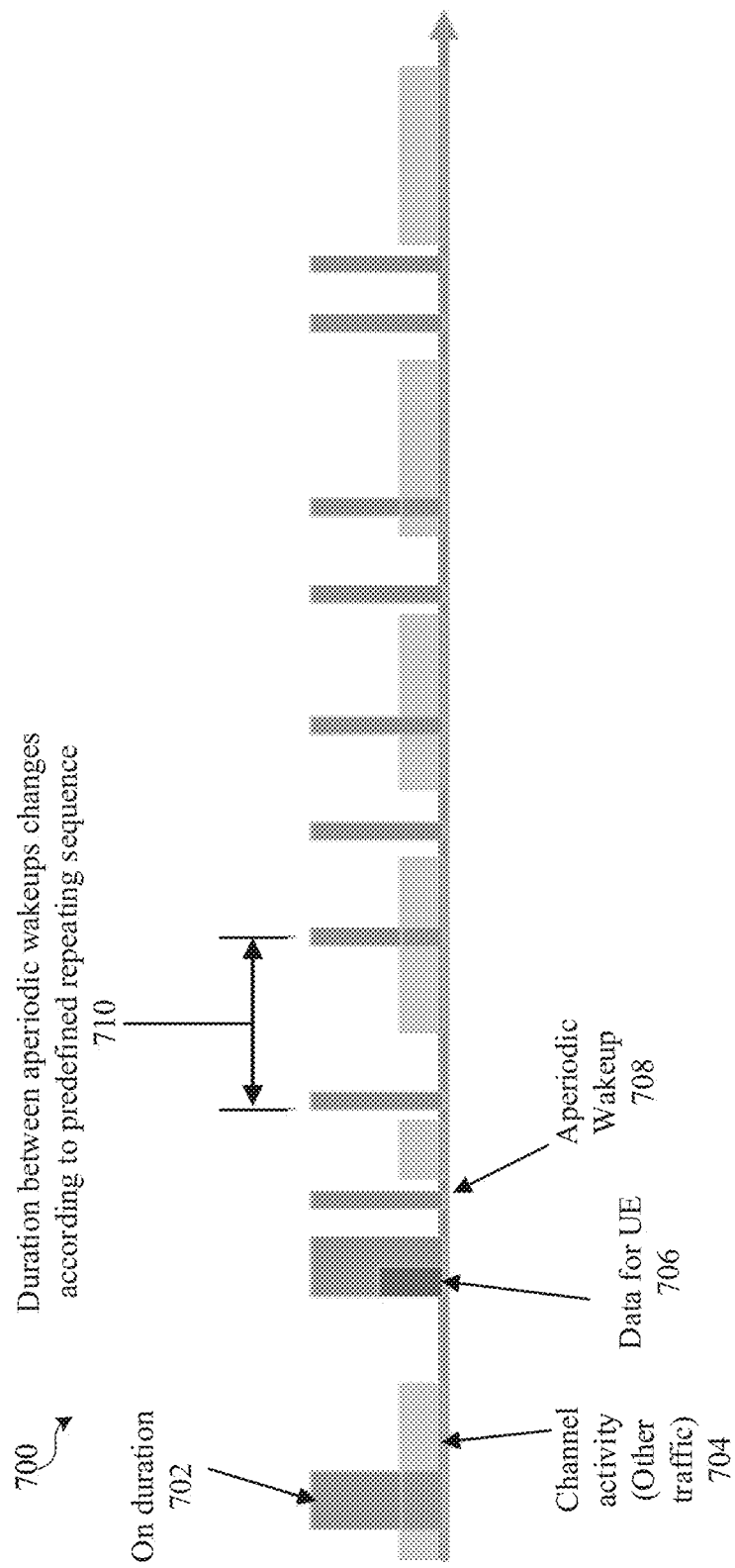
FIG. 7 is another exemplary block diagram of a DRX configuration for an unlicensed channel according to various embodiments described herein.

FIG. 7 is a block diagram of channel activity on an unlicensed channel for power management control in accord with various embodiments. The channel traffic 700 demonstrates aperiodic wakeup occasions according to DRX configuration at the UE 101 by the gNB 110 with examples of other traffic 804.

Traffic on the channel can be observed over some time (left to right x-axis) and the gNB 110 identifies patterns of activity. Patterns exist mainly due to the nature of applications and the enforcement of maximum channel occupancy times (MCOTs). This allows the gNB 110 to identify periods when there is a higher probability of channel being unoccupied than at other times. The UE 101 is then configured with two components: 1) periodic on-durations 702 and 706 as in DRX in NR, according to a DRX configuration (e.g., as provided at 706); and 2) a sequence of aperiodic wakeup occasions 710. The difference between the periodic on-duration 702 and the aperiodic wakeup occasions 708 is that the duration between the aperiodic wakeup occasions changes in a specified pattern. The gNB 110 selects the aperiodic occasions 708 by identifying times when the probability of the channel being occupied could be low(er) than other times.

The UE 101 can start DRX operation with just the periodic on-durations 702. After it receives a PDCCH 706, it switches to the aperiodic wakeup occasions 708 for a configured duration 710. After the configured duration 710, the UE 101 could switch back to periodic on-durations. The duration between aperiodic wakeups can change or repeat in a pattern that is predefined, as either overlapping the periodic on durations or in lieu thereof as shown in FIG. 8.

Figure 8:
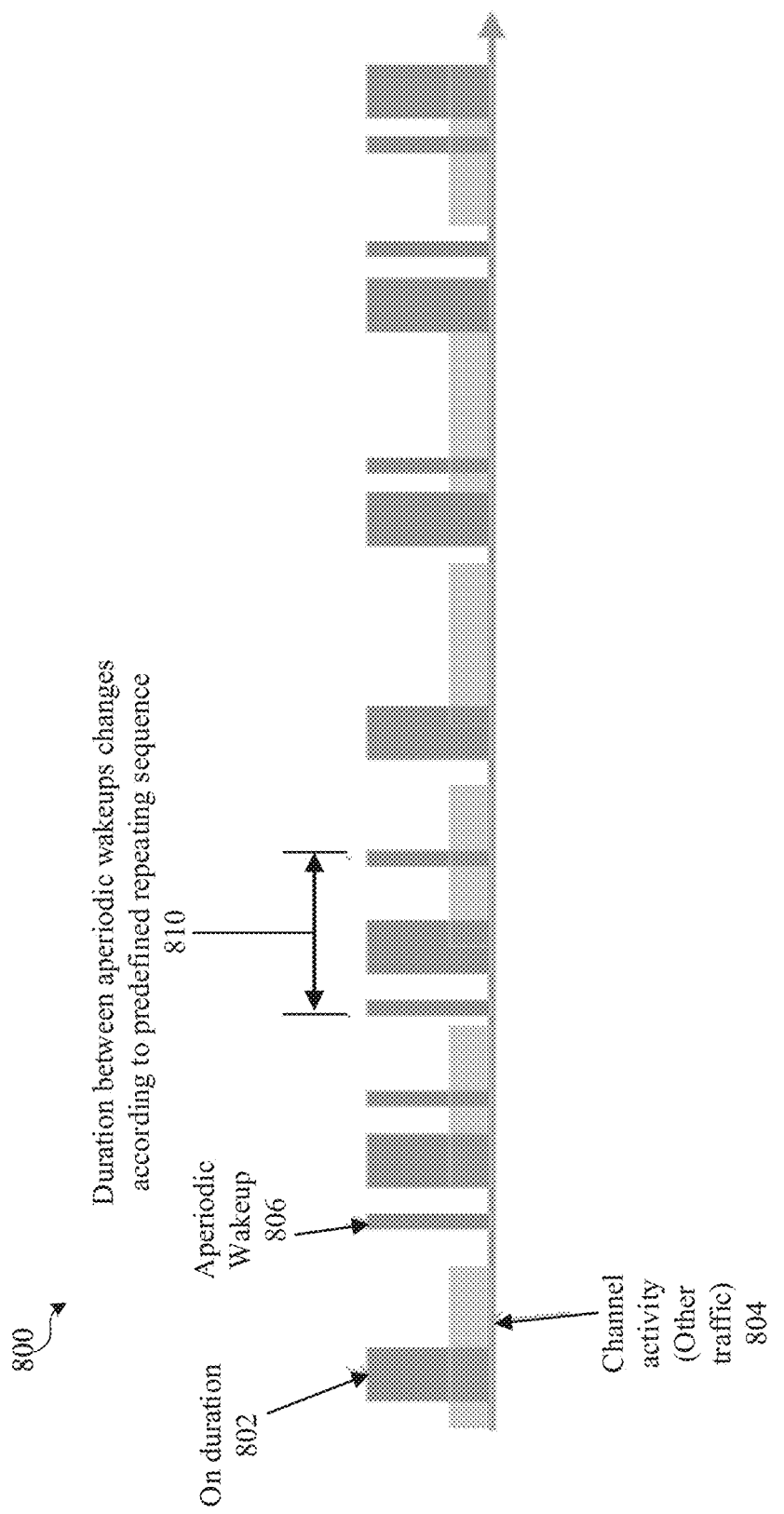
FIG. 8 is another exemplary block diagram of a DRX configuration for an unlicensed channel according to various embodiments described herein.

FIG. 8 demonstrates an example of channel activity 800 with on durations 802, aperiodic wakeups 806, examples of channel activity by other traffic 804, and a duration between aperiodic wakeups 810. As channel activity changes, the gNB 110 can modify the sequence of aperiodic wakeups. The gNB 110 can update the aperiodic wakeups 806 without updating the periodic on-durations.

In another embodiment, the periodic on-durations and the aperiodic wakeups can be superimposed. That is, after a UE 101 receives a PDCCH, it uses the aperiodic wakeups in addition to the periodic on-durations. This enables easier addition and removal of the aperiodic on-durations as the gNB 110 can rely on the UE 101 always waking up for the periodic on-durations.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment or example provided within this disclosure and can be applied to any of the systems disclosed herein.

Figure 9:
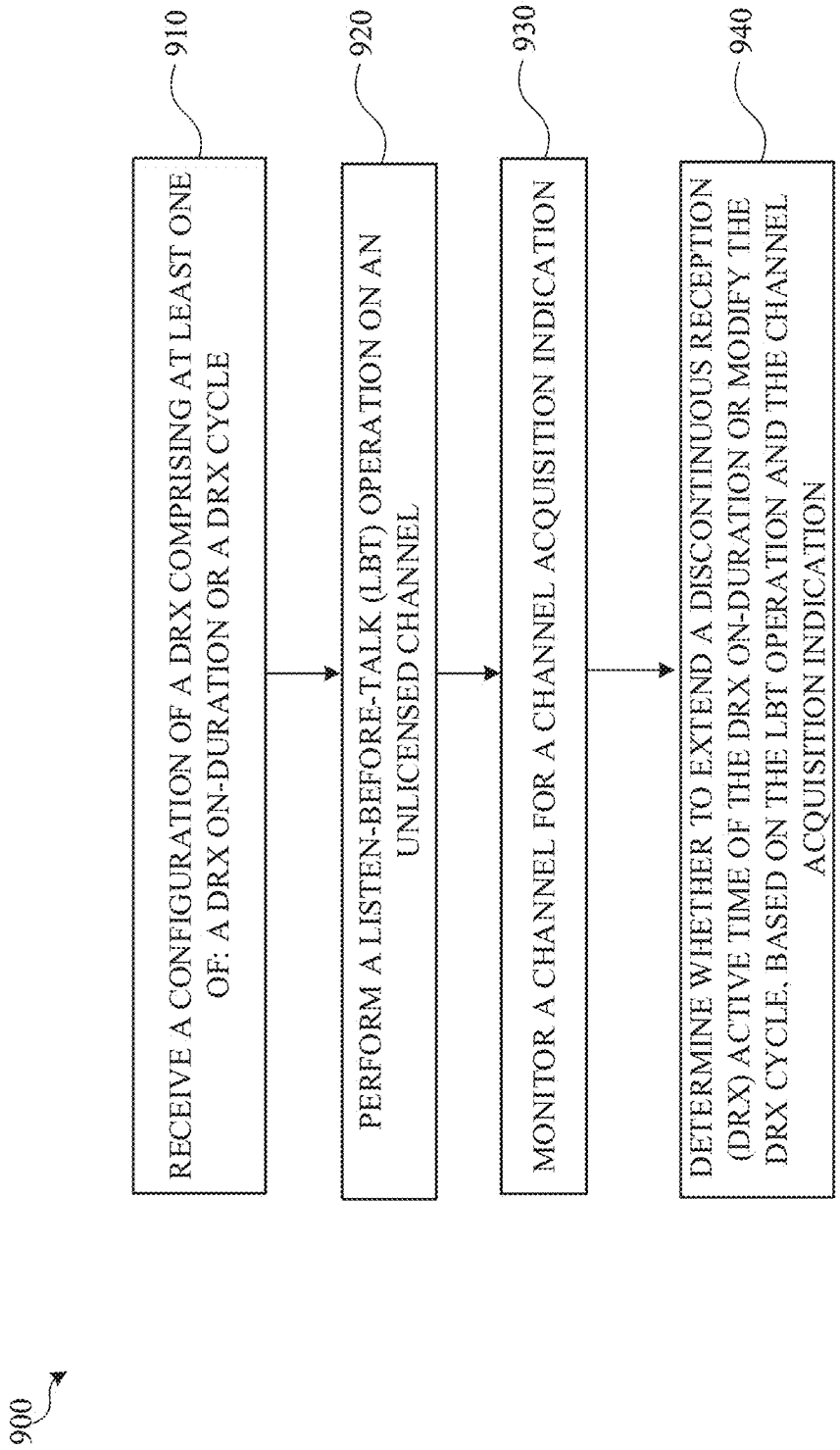
FIG. 9 is another block diagram illustrating an example process flow configuring DRX for unlicensed communication according to various embodiments described herein.

Referring to FIG. 9, illustrated is an example process flow 900 for a network device or component (e.g., UE 101, gNB 110, or other network component) to perform admission/congestion control operations for V2X communications among UE peer devices on a NR sidelink channel.

At 910, the process flow 900 includes receiving a configuration of a discontinuous reception (DRX) comprising at least one of: a DRX on-duration or a DRX cycle.

At 920, an LBT operation can be performed on an unlicensed channel.

At 930, a channel (e.g., PDCCH, or other physical channel) can be monitored or used for a channel acquisition indication.

At 940, the process flow 900 can include determining whether to extend a discontinuous reception (DRX) active time of the DRX on-duration or modify the DRX cycle, based on the LBT operation and the channel acquisition indication.

Other embodiments, or aspects, can include, in response to a determination that the unlicensed channel is busy based on the LBT operation, the UE 101 or gNB 110 can extend the DRX active time for a predefined period. In response to an outcome of the LBT operation being unsuccessful/busy and the channel acquisition indication being received, determining whether to extend the DRX active time by a predefined period or enter a DRX off period, based on a demodulation reference signal (DRMS) of a physical downlink control channel (PDCCH). Alternatively, or additionally, in response to the LBT operation indicating a busy condition or being unsuccessful, and the channel acquisition indication being received, UE 101 or gNB 110 can enter into a DRX off period. Alternatively, or additionally, in response to the LBT operation indicating an idle condition or being successful, and the channel acquisition indication not being received, entering into a DRX off period. Alternatively or additionally, in response to the LBT operation indicating an idle condition or being successful, and the channel acquisition indication is received, the UE 101 or gNB 110 can enter into a DRX off period or extend an active time, based on a determination that a DMRS of the channel indicates the channel acquisition indication and the channel acquisition indication is not associated with the UE.

Figure 10:
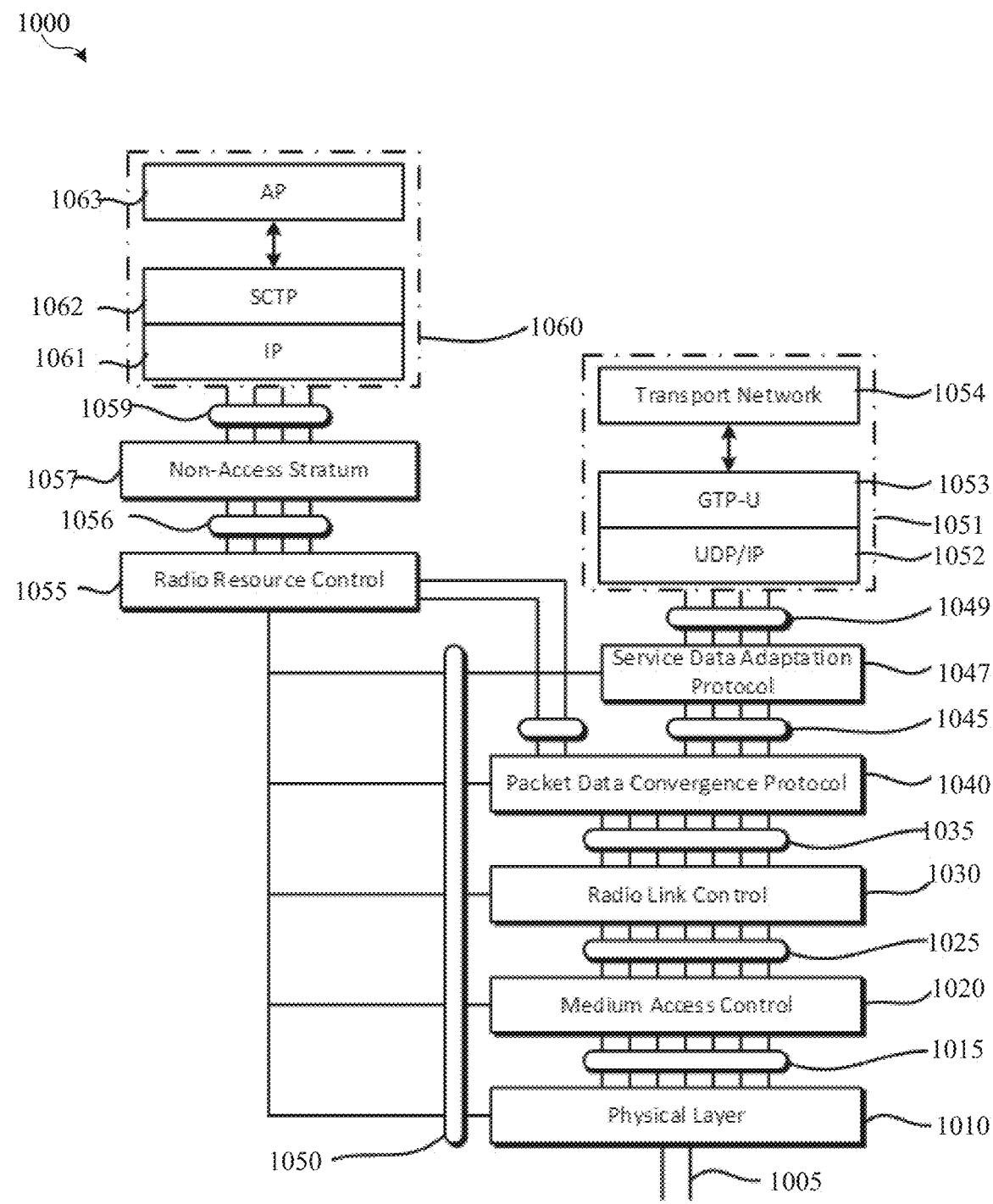
FIG. 10 illustrates various protocol functions that can be implemented in a wireless communication device according to various embodiments herein

FIG. 10 illustrates various protocol functions that can be implemented in a wireless communication device according to various embodiments herein. In particular, FIG. 10 includes an arrangement 1000 showing interconnections between various protocol layers/entities. The following description of FIG. 10 is provided for various protocol layers/entities that operate in conjunction with the 5G/NR system standards and LTE system standards, but some or all of the aspects of FIG. 10 can be applicable to other wireless communication network systems as well.

The protocol layers of arrangement 1000 can include one or more of Physical layer (PHY) 1010, Media Access Control layer (MAC) 1020, Radio Link Control layer (RLC) 1030, Packet Data Convergence Protocol layer (PDCP) 1040, Service Data Adaptation Protocol (SDAP) 1047, Radio Resource Control layer (RRC) 1055, and Non-Access Stratum (NAS) layer 1057, in addition to other higher layer functions not illustrated. The protocol layers can include one or more service access points (e.g., items 1059, 1056, 1050, 1049, 1045, 1035, 1025, and 1015 in FIG. 10) that can provide communication between two or more protocol layers.

The PHY 1010 can transmit and receive physical layer signals 1005 that can be received from or transmitted to one or more other communication devices. The physical layer signals 1005 can comprise one or more physical channels, such as those discussed herein. The PHY 1010 can further perform link adaptation or adaptive modulation and coding (AMC), power control, cell search (e.g., for initial synchronization and handover purposes), and other measurements used by higher layers, such as the RRC 1055. The PHY 1010 can still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1010 can process requests from and provide indications to an instance of MAC 1020 via one or more PHY-SAP 1015. According to some embodiments, requests and indications communicated via PHY-SAP 1015 can comprise one or more transport channels.

Instance(s) of MAC 1020 can process requests from, and provide indications to, an instance of RLC 1030 via one or more MAC-SAPs 1025. These requests and indications communicated via the MAC-SAP 1025 can comprise one or more logical channels. The MAC 1020 can perform mapping between the logical channels and transport channels, multiplexing of MAC SDUs from one or more logical channels onto TBs to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error correction through HARQ, and logical channel prioritization.

Instance(s) of RLC 1030 can process requests from and provide indications to an instance of PDCP 1040 via one or more radio link control service access points (RLC-SAP) 1035. These requests and indications communicated via RLC-SAP 1035 can comprise one or more RLC channels.

The RLC 1030 can operate in a plurality of modes of operation, including: Transparent Mode (TM), Unacknowledged Mode (UM), and Acknowledged Mode (AM). The RLC 1030 can execute transfer of upper layer protocol data units (PDUs), error correction through automatic repeat request (ARQ) for AM data transfers, and concatenation, segmentation and reassembly of RLC SDUs for UM and AM data transfers. The RLC 1030 can also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1040 can process requests from and provide indications to instance(s) of RRC 1055 and/or instance(s) of SDAP 1047 via one or more packet data convergence protocol service access points (PDCP-SAP) 1045. These requests and indications communicated via PDCP-SAP 1045 can comprise one or more radio bearers. The PDCP 1040 can execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1047 can process requests from and provide indications to one or more higher layer protocol entities via one or more SDAP-SAP 1049. These requests and indications communicated via SDAP-SAP 1049 can comprise one or more QoS flows. The SDAP 1047 can map QoS flows to DRBs, and vice versa, and can also mark QFIs in DL and UL packets. A single SDAP entity 1047 can be configured for an individual PDU session. In the UL direction, the NG-RAN 110 can control the mapping of QoS Flows to DRB(s) in two different ways, reflective mapping or explicit mapping. For reflective mapping, the SDAP 1047 of a UE 101 can monitor the QFIs of the DL packets for each DRB, and can apply the same mapping for packets flowing in the UL direction. For a DRB, the SDAP 1047 of the UE 101 can map the UL packets belonging to the QoS flows(s) corresponding to the QoS flow ID(s) and PDU session observed in the DL packets for that DRB. To enable reflective mapping, the NG-RAN can mark DL packets over the Uu interface with a QoS flow ID. The explicit mapping can involve the RRC 1055 configuring the SDAP 1047 with an explicit QoS flow to DRB mapping rule, which can be stored and followed by the SDAP 1047. In embodiments, the SDAP 1047 can only be used in NR implementations and can not be used in LTE implementations.

The RRC 1055 can configure, via one or more management service access points (M-SAP), aspects of one or more protocol layers, which can include one or more instances of PHY 1010, MAC 1020, RLC 1030, PDCP 1040 and SDAP 1047. In embodiments, an instance of RRC 1055 can process requests from and provide indications to one or more NAS entities 1057 via one or more RRC-SAPs 1056. The main services and functions of the RRC 1055 can include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs can comprise one or more IEs, which can each comprise individual data fields or data structures.

The NAS 1057 can form the highest stratum of the control plane between the UE 101 and the AMF. The NAS 1057 can support the mobility of the UEs 101 and the session management procedures to establish and maintain IP connectivity between the UE 101 and a P-GW in LTE systems.

According to various embodiments, one or more protocol entities of arrangement 1000 can be implemented in UEs 101, RAN nodes 111, AMF in NR implementations or MME in LTE implementations, UPF in NR implementations or S-GW and P-GW in LTE implementations, or the like to be used for control plane or user plane communications protocol stack between the aforementioned devices. In such embodiments, one or more protocol entities that can be implemented in one or more of UE 101, gNB 111, AMF, etc. can communicate with a respective peer protocol entity that can be implemented in or on another device using the services of respective lower layer protocol entities to perform such communication. In some embodiments, a gNB-CU of the gNB 111 can host the RRC 1055, SDAP 1047, and PDCP 1040 of the gNB that controls the operation of one or more gNB-DUs, and the gNB-DUs of the gNB 111 can each host the RLC 1030, MAC 1020, and PHY 1010 of the gNB 111.

In a first example, a control plane protocol stack can comprise, in order from highest layer to lowest layer, NAS 1057, RRC 1055, PDCP 1040, RLC 1030, MAC 1020, and PHY 1010. In this example, upper layers 1060 can be built on top of the NAS 1057, which includes an IP layer 1061, an SCTP 1062, and an application layer signaling protocol (AP) 1063.

In NR implementations, the AP 1063 can be an NG application protocol layer (NGAP or NG-AP) 1063 for the NG interface 113 defined between the NG-RAN node 111 and the AMF, or the AP 1063 can be an Xn application protocol layer (XnAP or Xn-AP) 1063 for the Xn interface that is defined between two or more RAN nodes 111.

The NG-AP 1063 can support the functions of the NG interface 113 and can comprise Elementary Procedures (EPs). An NG-AP EP can be a unit of interaction between the NG-RAN node 111 and the AMF. The NG-AP 1063 services can comprise two groups: UE-associated services (e.g., services related to a UE 101) and non-UE-associated services (e.g., services related to the whole NG interface instance between the NG-RAN node 111 and AMF). These services can include functions including, but not limited to: a paging function for the sending of paging requests to NG-RAN nodes 111 involved in a particular paging area; a UE context management function for allowing the AMF to establish, modify, and/or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 1063 can support the functions of the Xn interface and can comprise XnAP basic mobility procedures and XnAP global procedures. The XnAP basic mobility procedures can comprise procedures used to handle UE mobility within the NG RAN 111 (or E-UTRAN), such as handover preparation and cancellation procedures, SN Status Transfer procedures, UE context retrieval and UE context release procedures, RAN paging procedures, dual connectivity related procedures, and the like. The XnAP global procedures can comprise procedures that are not related to a specific UE 101, such as Xn interface setup and reset procedures, NG-RAN update procedures, cell activation procedures, and the like.

In LTE implementations, the AP 1063 can be an S1 Application Protocol layer (S1-AP) 1063 for the S1 interface 113 defined between an E-UTRAN node 111 and an MME, or the AP 1063 can be an X2 application protocol layer (X2AP or X2-AP) 1063 for the X2 interface that is defined between two or more E-UTRAN nodes 111.

The S1 Application Protocol layer (S1-AP) 1063 can support the functions of the S1 interface, and similar to the NG-AP discussed previously, the S1-AP can comprise S1-AP EPs. An S1-AP EP can be a unit of interaction between the E-UTRAN node 111 and an MME within CN 120 (e.g., as an LTE or NR CN). The S1-AP 1063 services can comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1063 can support the functions of the X2 interface XQ12 and can comprise X2AP basic mobility procedures and X2AP global procedures. The X2AP basic mobility procedures can comprise procedures used to handle UE mobility within the E-UTRAN XQ20, such as handover preparation and cancellation procedures, SN Status Transfer procedures, UE context retrieval and UE context release procedures, RAN paging procedures, dual connectivity related procedures, and the like. The X2AP global procedures can comprise procedures that are not related to a specific UE XQ01, such as X2 interface setup and reset procedures, load indication procedures, error indication procedures, cell activation procedures, and the like.

The SCTP layer (alternatively referred to as the SCTP/IP layer) 1062 can provide guaranteed delivery of application layer messages (e.g., NGAP or XnAP messages in NR implementations, or S1-AP or X2AP messages in LTE implementations). The SCTP 1062 can ensure reliable delivery of signaling messages between the RAN node 111 and the AMF/MME based, in part, on the IP protocol, supported by the IP 1061. The Internet Protocol layer (IP) 1061 can be used to perform packet addressing and routing functionality. In some implementations the IP layer 1061 can use point-to-point transmission to deliver and convey PDUs. In this regard, the RAN node 111 can comprise L2 and L1 layer communication links (e.g., wired or wireless) with the MME/AMF to exchange information.

In a second example, a user plane protocol stack can comprise, in order from highest layer to lowest layer, SDAP 1047, PDCP 1040, RLC 1030, MAC 1020, and PHY 1010. The user plane protocol stack can be used for communication between the UE 101, the RAN node 111, and UPF in NR implementations or an S-GW and P-GW in LTE implementations. In this example, upper layers 1051 can be built on top of the SDAP 1047, and can include a user datagram protocol (UDP) and IP security layer (UDP/IP) 1052, a General Packet Radio Service (GPRS) Tunneling Protocol for the user plane layer (GTP-U) 1053, and a User Plane PDU layer (UP PDU) 1063.

The transport network layer 1054 (also referred to as a "transport layer") can be built on IP transport, and the GTP-U 1053 can be used on top of the UDP/IP layer 1052 (comprising a UDP layer and IP layer) to carry user plane PDUs (UP-PDUs). The IP layer (also referred to as the "Internet layer") can be used to perform packet addressing and routing functionality. The IP layer can assign IP addresses to user data packets in any of IPv4, IPv6, or PPP formats, for example.

The GTP-U 1053 can be used for carrying user data within the GPRS core network and between the radio access network and the core network. The user data transported can be packets in any of IPv4, IPv6, or PPP formats, for example. The UDP/IP 1052 can provide checksums for data integrity, port numbers for addressing different functions at the source and destination, and encryption and authentication on the selected data flows. The RAN node 111 and the S-GW can utilize an S1-U interface to exchange user plane data via a protocol stack comprising an L1 layer (e.g., PHY 1010), an L2 layer (e.g., MAC 1020, RLC 1030, PDCP 1040, and/or SDAP 1047), the UDP/IP layer 1052, and the GTP-U 1053. The S-GW and the P-GW can utilize an S5/S8a interface to exchange user plane data via a protocol stack comprising an L1 layer, an L2 layer, the UDP/IP layer 1052, and the GTP-U 1053. As discussed previously, NAS protocols can support the mobility of the UE 101 and the session management procedures to establish and maintain IP connectivity between the UE 101 and the P-GW.

Moreover, although not shown by FIG. 10, an application layer can be present above the AP 1063 and/or the transport network layer 1054. The application layer can be a layer in which a user of the UE 101, RAN node 111, or other network element interacts with software applications being executed, for example, by application circuitry XS105 or application circuitry XS205, respectively. The application layer can also provide one or more interfaces for software applications to interact with communications systems of the UE 101 or RAN node 111, such as the baseband circuitry XT110. In some implementations the IP layer and/or the application layer can provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Various embodiments/aspects/examples can include the following:

Method(s) of managing DRX active time can be performed at a UE. This can include performing a listen-before-talk (LBT) operation, as well as monitoring for a channel acquisition indication that indicates the gNB has acquired the channel. The UE can further determine whether an extension of the DRX active time is required based on the success of the listen-before-talk operation (e.g., being idle, available for use, or reserved by the UE) and the reception of the channel acquisition indication at the UE.

Method(s) of managing power consumption at a UE by a gNB via DRX active time can include performing an LBT operation. In response to determining that the channel is busy, transmitting a data packet to a UE subsequent to the UE's DRX on-duration (e.g., in an extended active time duration). If the gNB is failing to receive and ACK/NACK indication from the UE, then additional transmissions to the UE can be ceased until the next DRX on-duration of the UE.

Method(s) of a gNB for managing power consumption in a UE operating on an unlicensed carrier can be configured based on periodic and aperiodic wakeup occasions. The gNB can determine a first set of repeating patterns of periods where the channel has a lower probability of being occupied by transmissions of other systems operating on the unlicensed carrier, and configure, at the UE, a sequence of wakeup occasions to overlap with the periods of the first set of repeating patterns. This data can be transmitted to the UE during one or more of the sequence of wakeup occasions.

Method(s) of a UE for managing power consumption can include receiving, from a gNB, a configuration of DRX comprising a sequence of wakeup occasions, wherein the time duration between successive wakeup occasions is not constant, and monitoring for transmission from gNB during the sequence of wakeup occasions.

A first set of examples can include the following:

A first example can include the method of providing additional scheduling opportunities to a network while managing the UE power consumption.

A second example can include the method of a first example, wherein the DRX active time and DRX off period for the UE and network is based on LBT outcome.

A third example can include the second or third example wherein if the LBT outcome is unsuccessful (e.g., channel is busy), the UE and network can extend the DRX active time for a predefined period.

A fourth example can include any one of the first thru third examples, wherein the DRX active time and DRX off period for the UE and network is based on LBT outcome and whether the UE receives the channel acquisition indication from the network A fifth example can include the fourth example, wherein if the LBT outcome is unsuccessful while channel acquisition indication is received, one possible behavior is that the UE extends the DRX active time by a predefined period.

A sixth example can include any one of the first thru fifth examples, wherein if the LBT outcome is unsuccessful while no channel acquisition indication is received, one possible behavior is that the UE goes to DRX off period A seventh example can include any one of the first thru sixth examples, wherein if the LBT outcome is successful while no channel acquisition indication is received, one possible behavior is that the UE goes to DRX off period.

An eighth example can include any one of the first thru seventh examples, wherein if LBT outcome is successful while channel acquisition is received, one possible behavior is that the UE goes to DRX off period.

A ninth example can include any one of the first thru eighth examples, wherein the UE switches to an aperiodic pattern for DRX active time from the normal periodic pattern when it receives its PDCCH and switches back to normal periodic pattern after a predefined period A tenth example can include any one of the first thru ninth examples, wherein the network can update the aperiodic pattern An eleventh example can include any one of the first thru tenth examples, wherein UE uses both the aperiodic pattern and the normal periodic pattern for DRX active time when it receives its PDCCH.

A twelfth example can include a method comprising: listening for traffic on a channel from one or more other devices in a listen-before-talk (LBT) active time period; determining that the channel is busy; and extending the active time period based on the determination.

A thirteenth example can include the twelfth example, wherein the active time period is extended by a predefined duration.

A fourteenth example can include any one of the twelfth thru thirteenth examples, further comprising receiving LBT configuration information that includes an indication of when the active time period is to occur.

A fifteenth example can include any one of the twelfth thru fourteenth examples, wherein the method is performed by a UE or a portion thereof.

A sixteenth example can include a method comprising: receiving configuration information to indicate periodic on-durations and aperiodic wakeup occasions for a LBT procedure on a channel; and performing the LBT procedure on the channel based on the configuration information.

A seventeenth example can include the sixteenth, wherein the method is performed by a UE or a portion thereof.

An eighteenth example can include a method comprising: monitoring traffic on a channel on which an LBT procedure is used for communication; determining periodic on-durations and aperiodic wakeup occasions for a UE to use for the LBT procedure on the channel based on the monitored traffic; and transmitting or causing to transmit configuration information to the UE to indicate the periodic on-durations and aperiodic wakeup occasions.

A nineteenth example can include the eighteenth example, wherein the method is performed by a gNB or a portion thereof.

A twentieth example can include any one of the twelfth thru nineteenth examples, wherein the channel is a new radio (NR) channel.

A twenty-first example can include the any one of the twelfth thru twentieth examples, wherein the channel is a random access channel.

A twenty-second example can include an apparatus comprising means to perform one or more elements of a method described in or related to any of first thru twenty-first examples, or any other method or process described herein.

A twenty-third example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A twenty-fourth example can include an apparatus comprising logic, modules, or circuitry to perform one or more elements of a method described in or related to any one of the first thru twenty-first examples, or any other method or process described herein.

A twenty-fifth example can include a method, technique, or process as described in or related any one of the first thru twenty-first examples, or portions or parts thereof.

A twenty-sixth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A twenty-seventh example can include a signal as described in or related to any of examples 1-21, or portions or parts thereof.

A twenty-eighth example can include a datagram, packet, frame, segment, protocol data unit (PDU), or message as described in or related to any one of the first thru twenty-first examples, or portions or parts thereof, or otherwise described in the present disclosure.

A twenty-ninth example can include a signal encoded with data as described in or related to any one of the first thru twenty-first examples, or portions or parts thereof, or otherwise described in the present disclosure.

A thirtieth example can include a signal encoded with a datagram, packet, frame, segment, protocol data unit (PDU), or message as described in or related to any one of the first thru twenty-first examples, or portions or parts thereof, or otherwise described in the present disclosure.

A thirty-first example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A thirty-second example can include a computer program comprising instructions, wherein execution of the program by a processing element is to cause the processing element to carry out the method, techniques, or process as described in or related to any one of the first thru twenty-first examples, or portions thereof.

A thirty-third example can include a signal in a wireless network as shown and described herein.

A thirty-fourth example can include a method of communicating in a wireless network as shown and described herein.

A thirty-fifth example can include a system for providing wireless communication as shown and described herein.

A thirty-sixth example can include a device for providing wireless communication as shown and described herein.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A second set of examples can include the following:

A first example as an apparatus employed in a user equipment (UE), comprising: processing circuitry configured to: perform a listen-before-talk (LBT) operation on a unlicensed channel; monitor a channel for a channel acquisition indication; and determine whether to configure an extension of a discontinuous reception (DRX) active time based on the LBT operation; and a radio frequency (RF) interface, configured to provide, to RF circuitry, data for a transmission or a reception of an NR communication associated with the unlicensed channel based on the LBT operation and the channel acquisition indication for managing or reducing power consumption.

A second example can include the first example, wherein the processing circuitry is further configured to determine whether to configure the extension of the DRX active time based on the LBT operation and the channel acquisition indication on the channel, wherein the channel comprises a physical downlink control channel (PDCCH).

A third example can include any one of the first or second examples, wherein the processing circuitry is further configured to extend the DRX active time in response to the LBT operation indicating the unlicensed channel is busy.

A fourth example can include any one of the first thru third examples, wherein the processing circuitry is further configured to shorten a DRX cycle of the DRX active time or increase a DRX on-duration, based on the LBT operation and whether the channel acquisition indication is received.

A fifth example can include any one of the first thru fourth examples, wherein the processing circuitry is further configured to determine the channel acquisition indication being received corresponds to the UE based on a demodulation reference signal (DMRS) in the channel, wherein the channel comprises a PDCCH.

A sixth example can include any one of the first thru fifth examples, wherein the processing circuitry is further configured to process a configuration for DRX that configures a sequence of aperiodic wakeup occasions by which to monitor the channel, wherein a duration between the aperiodic wakeup occasions varies within the sequence.

A seventh example can include any one of the first thru sixth examples, wherein the processing circuitry is further configured to superimpose the sequence of aperiodic wakeup occasions with periodic on-durations, or switches to the sequence of aperiodic wakeup occasions based on a configured duration in response to receiving the channel acquisition indication via a PDCCH and to the periodic on-durations after the configured duration.

A eighth example can include any one of the first thru seventh examples, wherein the sequence of aperiodic wakeup occasions is based on a probability of occupation of the unlicensed channel.

A ninth example is a tangible computer readable storage device storing executable instructions that, in response to execution, cause one or more processors of a user equipment (UE) to perform operations, the operations comprising: receiving a configuration of a discontinuous reception (DRX) comprising at least one of: a DRX on-duration or a DRX cycle; performing a listen-before-talk (LBT) operation on an unlicensed channel; monitoring a channel for a channel acquisition indication; and determining whether to extend a DRX active time of the DRX on-duration or modify the DRX cycle, based on the LBT operation and the channel acquisition indication.

A tenth example can include the ninth examples, the operations further comprising: in response to a determination that the unlicensed channel is busy based on the LBT operation, extending the DRX active time for a predefined period.

An eleventh example can include any one of the ninth thru tenth examples, the operations further comprising: in response to an outcome of the LBT operation being unsuccessful or the unlicensed channel busy and the channel acquisition indication being received, determining whether to extend the DRX active time by a predefined period or enter a DRX off period, based on a demodulation reference signal (DRMS) of a physical downlink control channel (PDCCH).

A twelfth example can include any one of the ninth thru eleventh examples, the operations further comprising: in response to the LBT operation indicating a busy condition or being unsuccessful, and the channel acquisition indication being received, entering into a DRX off period.

A thirteenth example can include any one of the ninth thru twelfth examples, the operations further comprising: in response to the LBT operation indicating an idle condition or being successful, and the channel acquisition indication not being received, entering into a DRX off period.

A fourteenth example can include any one of the ninth thru thirteenth examples, the operations further comprising: in response to the LBT operation indicating an idle condition or being successful, and the channel acquisition indication is received, entering into a DRX off period or extend an active time, based on a determination that a DMRS of the channel indicates the channel acquisition indication and the channel acquisition indication is not associated with the UE.

A fifteenth example can be a tangible computer readable storage device storing executable instructions that, in response to execution, cause one or more processors of a next generation NodeB (gNB) to perform operations, the operations comprising: performing a listen-before-talk (LBT) operation to determine whether an unlicensed channel is idle or busy; transmitting data subsequent to a DRX on-duration; and providing a channel acquisition indication in response to the unlicensed channel being idle; in response to not receiving an ACK/NACK indication, ceasing additional transmissions via a physical downlink channel until a next DRX on-duration.

A sixteenth example includes the fifteenth example, the operations further comprising: providing the data in an extended active time in response to the LBT operation determining the unlicensed channel to be busy and receiving an ACK/NACK indication.

A seventeenth example includes any one of the fifteenth thru sixteenth examples, the operations further comprising: determining a first set of repeating patterns of periods where the unlicensed channel has a lower probability of being occupied on the unlicensed channel than at other periods; providing a configuration of a sequence of wakeup occasions to overlap with the periods of the first set of repeating patterns; and transmitting the data to a UE during one or more of the sequence of wakeup occasions, wherein the wakeup occasions of the sequence of wakeup occasions are aperiodic and the periods are periodic.

An eighteenth example includes any one of the fifteenth thru seventeenth examples, the operations further comprising: providing an updated of an aperiodic pattern of the sequence of wakeup occasions based on a change in the lower probability.

A nineteenth example includes any one of the fifteenth thru eighteenth examples, the operations further comprising:

providing LBT operation configuration information that includes an indication of when an active time period is to occur.

A twentieth example includes any one of the fifteenth thru nineteenth examples, the operations further comprising: monitoring traffic on the unlicensed channel on which the LBT operation is used for communication; determining periodic on-durations and aperiodic wakeup occasions for a UE to use for the LBT operation on the unlicensed channel based on the monitored traffic; and transmitting configuration information to the UE to indicate the periodic on-durations and the aperiodic wakeup occasions.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor configured to, when executing instructions stored in a memory, perform operations comprising:
    performing a listen-before-talk (LBT) operation on an unlicensed channel;
    monitoring a channel for a channel acquisition indication from a base station; and
    determining to extend a discontinuous reception (DRX) active time based on the LBT operation and the channel acquisition indication; and
    communicating, via a radio frequency (RF) interface and during an active time of the extended DRX active time, data for a transmission or a reception of a communication associated with the unlicensed channel based on the LBT operation and the channel acquisition indication.

2. The baseband processor of claim 1, wherein the channel comprises a physical downlink control channel (PDCCH).

3. The baseband processor of claim 2, the operations further comprising:
    extending the DRX active time in response to the LBT operation indicating the unlicensed channel is busy.

4. The baseband processor of claim 2, the operations further comprising:
    determining whether the channel acquisition indication is received based on a demodulation reference signal (DMRS) on the channel.

5. The baseband processor of claim 2, the operations further comprising:
    shortening a DRX cycle of the DRX active time or increasing a DRX on-duration, based on the LBT operation and whether the channel acquisition indication is received.

6. The baseband processor of claim 5, the operations further comprising:
    processing a configuration for DRX that configures a sequence of aperiodic wakeup occasions by which to monitor the unlicensed channel, wherein a duration between the aperiodic wakeup occasions varies within the sequence.

7. The baseband processor of claim 6, the operations further comprising:
    superimposing the sequence of aperiodic wakeup occasions with periodic on-durations, or switching from the periodic on-durations to the sequence of aperiodic wakeup occasions based on a configured duration in response to receiving the channel acquisition indication via the PDCCH.

8. The baseband processor of claim 6, wherein the sequence of aperiodic wakeup occasions is based on a probability of occupation of the unlicensed channel.

9. A tangible computer readable storage device storing executable instructions that, in response to execution, cause one or more processors to perform operations comprising:
receiving a discontinuous reception (DRX) configuration to configure at least one of: a DRX on-duration or a DRX cycle;
performing a listen-before-talk (LBT) operation on an unlicensed channel;
monitoring a channel for a channel acquisition indication from a base station; and
determining to modify the DRX cycle, based on the LBT operation and the channel acquisition indication.

10. The tangible computer readable storage device of claim 9, the operations further comprising:
in response to a determination that the unlicensed channel is busy based on the LBT operation, extending a DRX active time of the DRX on duration for a predefined period.

11. The tangible computer readable storage device of claim 10, the operations further comprising:
in response to an outcome of the LBT operation being unsuccessful or the unlicensed channel being busy and the channel acquisition indication being received, determining to extend the DRX active time by a predefined period or enter a DRX off period, based on a demodulation reference signal (DMRS) of a physical downlink control channel (PDCCH).

12. The tangible computer readable storage device of claim 11, the operations further comprising:
in response to the LBT operation indicating a busy condition or being unsuccessful, and the channel acquisition indication being received, entering into a DRX off period.

13. A tangible computer readable storage device storing executable instructions that, in response to execution, cause one or more processors to perform operations comprising:
performing a listen-before-talk (LBT) operation to determine whether an unlicensed channel is idle or busy;
transmitting data subsequent to a discontinuous reception (DRX) on-duration; and
providing a channel acquisition indication in response to the unlicensed channel being idle; and
in response to not receiving an acknowledgement/negative acknowledgment (ACK/NACK) indication, ceasing additional transmissions via a physical downlink channel until a next DRX on-duration.

14. The tangible computer readable storage device of claim 13, the operations further comprising:
providing the data in an extended active time in response to the LBT operation determining the unlicensed channel to be busy and receiving an ACK/NACK indication.

15. The tangible computer readable storage device of claim 14, the operations further comprising:
determining a first set of repeating patterns of periods where the unlicensed channel has a lower probability of being occupied on the unlicensed channel than at other periods;
providing a configuration of a sequence of wakeup occasions to overlap with the periods of the first set of repeating patterns; and
transmitting the data to a user equipment (UE) during one or more of the sequence of wakeup occasions, wherein the wakeup occasions of the sequence of wakeup occasions are aperiodic and the periods are periodic.

16. The tangible computer readable storage device of claim 15, the operations further comprising:
providing an update of an aperiodic pattern of the sequence of wakeup occasions based on a change in the lower probability.

17. The tangible computer readable storage device of claim 16, the operations further comprising:
providing LBT operation configuration information that includes an indication of when an active time period is to occur.

18. The tangible computer readable storage device of claim 17, the operations further comprising:
monitoring traffic on the unlicensed channel on which the LBT operation is used for communication;
determining periodic on-durations and aperiodic wakeup occasions for a UE to use for the LBT operation on the unlicensed channel based on the monitored traffic; and
transmitting configuration information to the UE to indicate the periodic on-durations and the aperiodic wakeup occasions.

19. The baseband processor of claim 1, wherein the operations further comprise communicating, via the RF interface, the data for the transmission of the communication to the base station or the reception of the communication from the base station.

20. The tangible computer readable storage device of claim 9, wherein the channel acquisition indication indicates whether the base station has acquired the unlicensed channel.

* * * * *